(12) United States Patent
Irwin

(10) Patent No.: US 11,745,699 B2
(45) Date of Patent: Sep. 5, 2023

(54) VEHICLE SECURITY SYSTEM

(71) Applicant: Kelly Irwin, Rogers, AR (US)

(72) Inventor: Kelly Irwin, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 0 days.

(21) Appl. No.: 17/746,701

(22) Filed: May 17, 2022

(65) Prior Publication Data

US 2022/0371546 A1 Nov. 24, 2022

Related U.S. Application Data

(60) Provisional application No. 63/189,794, filed on May 18, 2021.

(51) Int. Cl.
*B60R 25/10* (2013.01)

(52) U.S. Cl.
CPC ...... *B60R 25/1012* (2013.01); *B60R 25/1003* (2013.01)

(58) Field of Classification Search
CPC ................. B60R 25/1012; B60R 25/1003
See application file for complete search history.

(56) References Cited

U.S. PATENT DOCUMENTS

| | | | |
|---|---|---|---|
| 3,209,326 A * | 9/1965 | Heiser | B60R 25/1004 340/428 |
| 3,699,515 A | 10/1972 | Barnett | |
| 3,792,435 A | 2/1974 | Pace et al. | |
| 3,858,175 A | 12/1974 | Kopera, Jr. | |
| 4,174,516 A | 11/1979 | Cleary | |
| 5,216,407 A | 6/1993 | Hwang | |
| 5,334,969 A | 8/1994 | Abe et al. | |
| 5,619,074 A * | 4/1997 | Berch | B60R 25/04 340/12.27 |
| 5,729,191 A * | 3/1998 | Allen | G07C 9/00182 340/12.54 |
| 6,523,964 B2 * | 2/2003 | Schofield | B60R 1/12 348/E7.086 |
| 6,753,763 B2 | 6/2004 | Flick | |
| 7,492,255 B1 * | 2/2009 | Morris | B60R 25/102 340/541 |
| 8,319,600 B2 | 11/2012 | Hsieh | |
| 10,848,720 B2 * | 11/2020 | Zhang | H04N 7/18 |
| 2008/0079551 A1 * | 4/2008 | Blanchet | G08G 1/20 340/426.1 |
| 2008/0252730 A1 * | 10/2008 | Hong | H04N 23/56 340/567 |
| 2013/0049946 A1 * | 2/2013 | Chavez | B60Q 1/00 340/457 |
| 2017/0217455 A1 * | 8/2017 | Coston | B61L 15/009 |
| 2021/0188213 A1 * | 6/2021 | Stabel | B60Q 1/50 |

* cited by examiner

*Primary Examiner* — Nay Tun
(74) *Attorney, Agent, or Firm* — Boyd D. Cox

(57) ABSTRACT

A vehicle security system for a vehicle deters break-ins with an infrared sensor that monitors the interior of the vehicle. When movement is detected by the infrared sensor, the lights and sirens of an armed vehicle are activated. The security system automatically arms when the ignition of the vehicle is turned off and automatically disarms when the ignition of the vehicle is turned on.

22 Claims, 4 Drawing Sheets

VEHICLE SECURITY SYSTEM

I. BACKGROUND

The present invention is directed to a security system for a vehicle, particularly a police vehicle, that automatically arms when the engine of the vehicle is turned off and automatically disarms when the vehicle's engine is started. The security system monitors the vehicle's interior such that detection of infrared radiation generated by a person moving within the vehicle triggers the system, thereby setting, off the lights and siren of the vehicle.

Many police departments allow police vehicles to be taken home by the officers and police weapons re often left in the vehicle overnight. Weapons are typically secured in patrol vehicles by a weapon mount that deters a quick "smash and grab" type of theft. However, weapons left in an unattended vehicle for long periods of time, such as overnight, are particularly vulnerable to theft, since a thief generally has time to mechanically disable the weapon mount and remove the weapons. Consequently, precautions such as door locks and weapon mounts can fail to keep criminals from accessing weapons stored in vehicles. Therefore, added protection against the theft of weapons from vehicles, particularly police and other security vehicles, is needed.

Security systems typically have to be manually armed by the user. In some cases the user can forget to arm the system or simply fail to arm the system when time constraints might not allow. The security system of the present invention automatically arms itself after the vehicle engine is turned off and a preselected time period has elapsed so that the user does not have to take an extra step or remember to arm the security system.

The security system of the present invention automatically disarms when the vehicle engine is started, so there is no need for the driver to perform an extra function in order to disarm the system.

In addition, the security system can be easily disabled by an authorized user. When disabled, the security system does not automatically arm when the vehicle's ignition is turned off. This is of particular use in instances where arming the security system is not desired, such as when the vehicle is being serviced, repaired or stored.

Many police vehicles only have weapon mounts to secure the police weapons in the vehicle. Although these mounts can be a deterrent to theft, the weapons still can be damaged if unauthorized removal is attempted. Furthermore, such weapon mounts fail to issue a visual or auditory alarm to notify persons of an attempted theft or to scare away a potential thief.

The present invention includes an infrared (IR) sensor to monitor movement inside of the vehicle. When movement is detected by the infrared sensor within the vehicle, the security system triggers the lights and siren of the vehicle. This can alert anyone nearby and can act to scare away a criminal.

The security system of the present invention automatically arms when the ignition of the vehicle is turned off and a selected period of time has elapsed subsequently. When the vehicle's engine is started, the security device automatically disarms.

When the system detects movement within the vehicle, activation of the vehicle's lights and siren is delayed for a preselected time period. This allows an authorized user to enter and start the vehicle without triggering the lights and siren.

The security system of the present invention connects with the after market equipment in a typical police vehicle and engages the vehicle's light/siren controller for activating the lights and sirens of the vehicle. Therefore, there is no need for additional lights or siren to be installed in the vehicle.

The security system of the present invention comprises "smart" security hardware that does not require outside interaction for arming and disarming. For ample, when a vehicle's engine is started, the security system in the vehicle automatically disarms. After the engine is turned off, the system begins the arming process. Both of these functions occur independently within the vehicle without interaction from a separate source.

II. SUMMARY

The security system of the present invention deters break-ins and subsequent thefts from police and other vehicles, particularly the theft of weapons. The security system has an infrared sensor that monitors the interior of the vehicle and when movement is detected within the vehicle, the system activates the lights and sirens of the vehicle to alert people nearby and to scare off any potential thief.

It is an object of the present invention to provide a vehicle security system that deters the theft of items from the vehicle.

It is a further object of the present invention to provide a vehicle security system that automatically arms after the vehicle is turned off.

It is a further object of the present invention to provide a vehicle security system that automatically disarms itself after the ignition of the vehicle is turned on.

It is a further object of the present invention to provide a vehicle security system that can be readily disabled and enabled.

It is a further object of the present invention to provide a security system for a police vehicle that engages the siren and lights of the vehicle as an alarm signal.

It is a further object of the present invention to provide a security system for a vehicle in which the siren, after being triggered, is automatically turned off after a preselected time has elapsed.

It is a further object of the present invention to provide a security system for a vehicle in which the siren, after being triggered, is automatically turned off after a preselected time has elapsed and the siren alarm s then reset to go off in the event that another triggering event occurs.

It is a further object of the present invention to provide a security system vehicle in which the lights, after being triggered, continue to flash until the vehicle engine is started.

It is a further object of the present invention to provide a vehicle security system that directly arms and disarms itself without going through a remote location.

It is a further object of the present invention to provide a vehicle security system that has a user selectable time period that elapses before the alarm is triggered and after an intruder has been detected in the vehicle.

It is a further object of the present invention to provide a vehicle security system that has a user selectable time period to sound the siren, after which time period elapses, the siren stops.

It is a further object of the present invention to provide a vehicle security device that, when triggered, actuates the vehicle's siren and lights, wherein the siren sounds for a preselected time period and stops when the time period has elapsed, while the lights continue to flash.

It is a further object of the present invention to provide a vehicle security system that arms itself after a user selectable time period has elapsed after the vehicle's engine is turned off.

It is a further object of the present invention to provide a vehicle security system that, when triggered, activates the siren and the lights of the vehicle in which the system is installed.

It is a further object of the present invention to provide a vehicle security system that uses the original ignition of the vehicle.

It is a further object of the present invention to provide a vehicle security system that provides a visual indicator when the system is armed.

III. BRIEF DESCRIPTION OF THE DRAWINGS

Reference is made to the accompanying drawings in which are shown illustrative embodiments of the invention and from which novel features and advantages will be apparent.

IV. DETAILED DESCRIPTION

Figure 1:
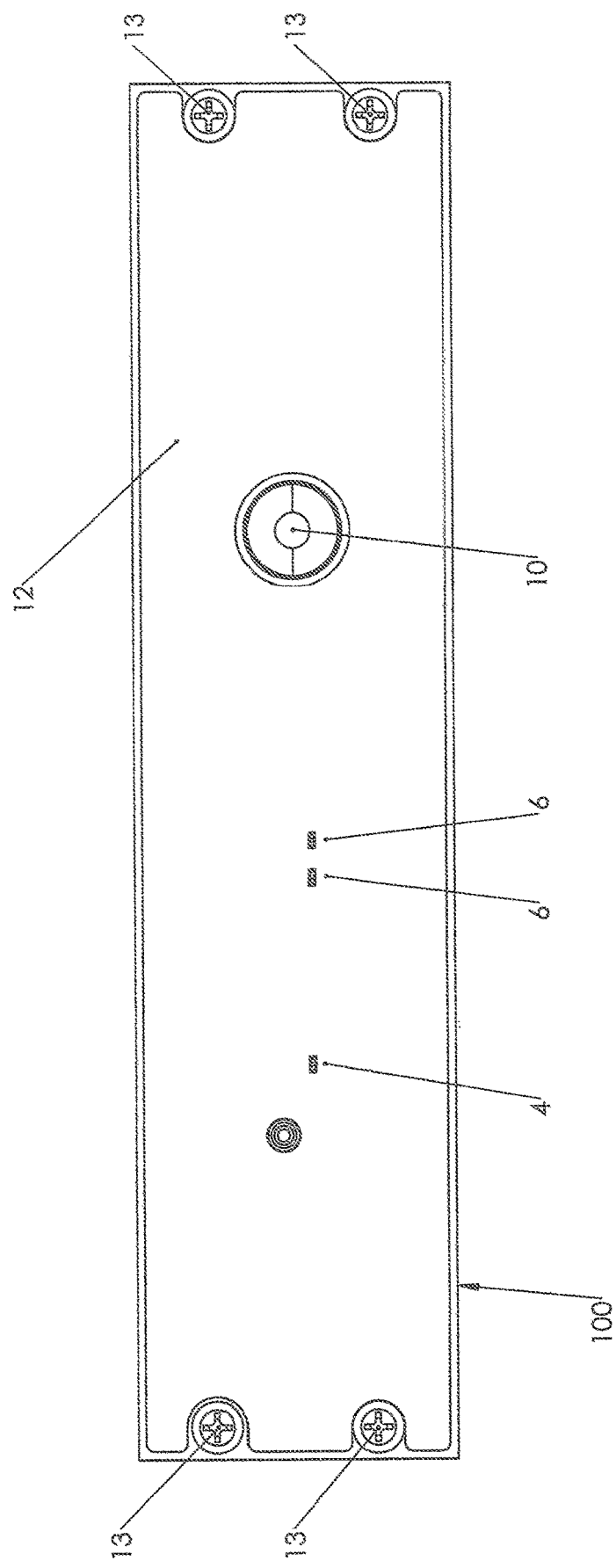
FIG. 1 is a planar view of the top of the security system of the present invention.
Figure 2:
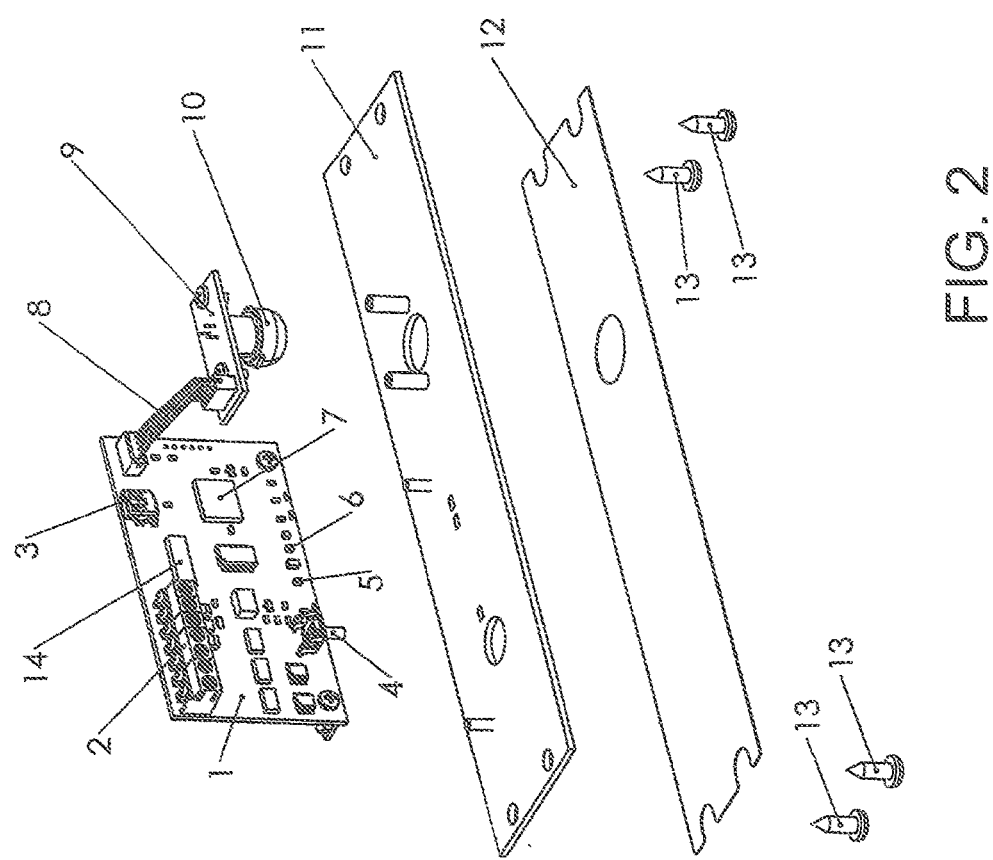
FIG. 2 is an exploded perspective view of the security system shown in FIG. 1.
Figure 3:
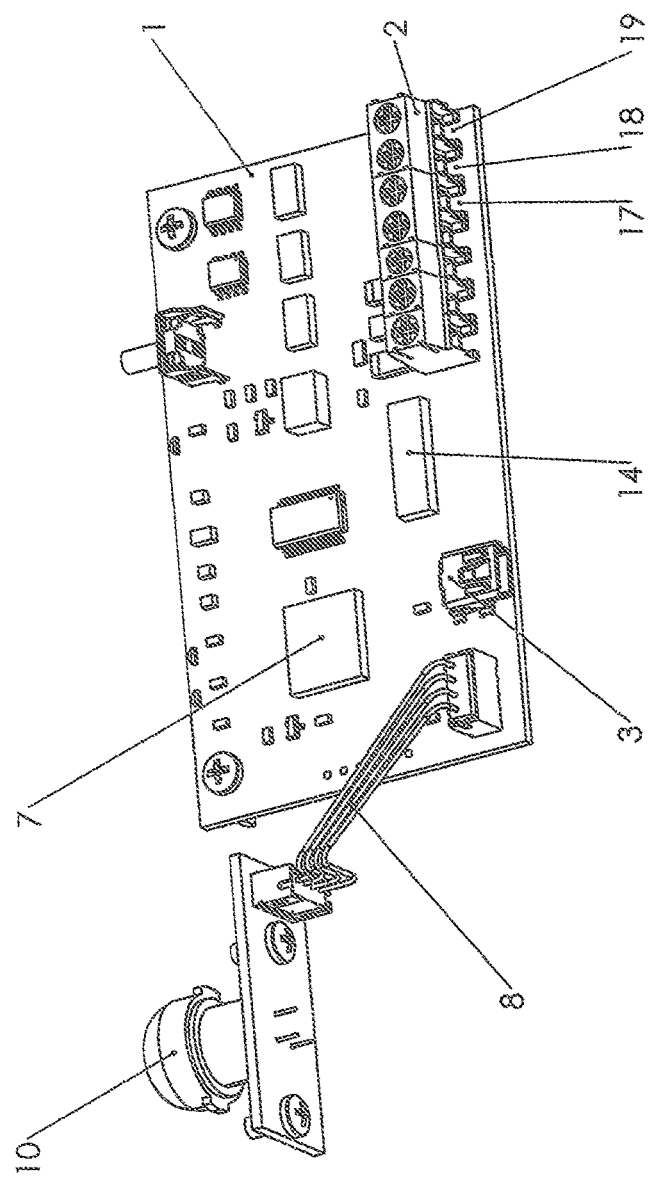
FIG. 3 is a perspective view of the printed circuit board assembly of the security system shown in FIG. 2.

An infrared sensor is an electronic instrument that is used to detect infrared radiation emitted by an object in its surrounding environment. Objects that have a temperature above approximately five degrees Kelvin give off infrared radiation. Since the human body generates heat above that amount, a person emits infrared radiation. Consequently, a person can be detected by an infrared sensor when that person moves into the sensing range of the device and the sensor can send an electronic signal to trigger an alarm.

Referring to FIGS. 1-4, there is shown a vehicle security system (100) of the present invention which utilizes hardware and software to perform desired functions. The security system (100) which can be armed and disarmed has a primary printed circuit board assembly (1), a microprocessor (7) a secondary printed circuit board assembly (9), an infrared (IR) sensor (10) and a faceplate (11).

The primary printed circuit board assembly (1) includes an input/output terminal block (2), a dual in-line package (DIP) switch (14), an infrared expansion port (3), and an armed indicator (6). The primary printed circuit board assembly (I) further comprises an enable/disable button (4) and an enable/disable indicator (5).

The input/output terminal block (2) is a connector that allows wire to be secured to the primary printed circuit board assembly (1). The terminal block (2) is used for power input and function output which includes a first alarm output (17), a second alarm output (18), and a third, alarm output (19). The first alarm output (17) triggers the light/siren controller of the vehicle. The second alarm output (18) extends to the siren on the vehicle and actuates the siren when the light/siren controller has been triggered by the first alarm output (17). The third alarm output (19) extends to the lights on the vehicle and activates the lights when the light/siren controller has been triggered.

The microprocessor (7) is installed on the primary printed circuit board assembly (1). The primary printed circuit board assembly (1) is connected to the secondary printed circuit board assembly (9) by a cable assembly (8). The infrared sensor (10) is disposed on the secondary printed circuit board assembly (9) and extends through the faceplate (11) and the graphic overlay (12) and into the interior area of the vehicle. The enable/disable indicator (5) is preferably an amber colored LED light. The armed indicator (6) is preferably a combination of red and blue colored LED lights.

The infrared sensor (10) monitors the interior of the vehicle for the presence of a person in the vehicle. When movement of an individual is detected within the vehicle by the infrared sensor (10), the three outputs (17, 18, 19) on the primary printed circuit board assembly (1) are triggered. The first output (17) triggers the light/siren controller of the vehicle, thereby allowing the second (18) and third (19) alarm outputs to function. The second output (18) is connected to and communicates with the siren input of the light/siren controller which controls the vehicle's siren. The third output (19) is connected to and communicates with the light input of the light/siren controller which controls the vehicle's lights. The second (18) and third (19) alarm outputs are actuated after the first alarm output (17) has been triggered.

The enable/disable button (4) has a dual function. When depressed for a certain period of time, the button (4) disables the security system (100). Conversely, the enable/disable button (4) also re-enables the security system (100). By depressing the enable/disable button (4) while the security system (100) is disabled, the security system (100) can be enabled once again.

The armed indicator (6) illuminates when the system (100) is armed. When the system (100) is unarmed, the armed indicator (6) is turned off and is not illuminated.

The vehicle security system (100) is hard-wired into the existing electrical system of the vehicle in which the system (100) is installed. Preferably, the system uses a 12 v+ ignition and a 12 v+ ground.

Figure 4:
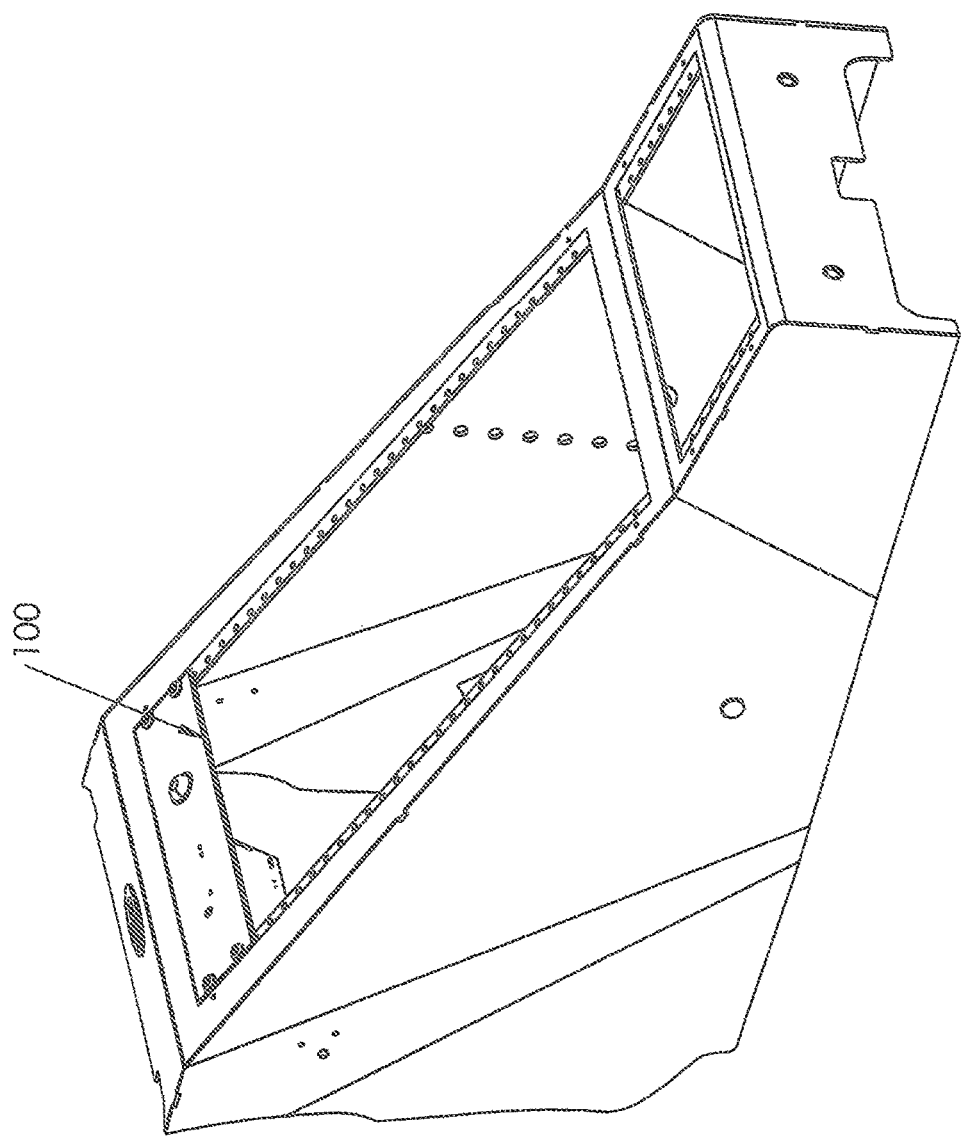
FIG. 4 is a partial perspective view of the security system of FIG. 1 installed in a vehicle.

The security system (100) is preferably installed on the console of a vehicle's interior area as shown in FIG. 4.

The infrared expansion port (3) on the primary printed circuit board assembly (1) allows for additional infrared sensors to be added into the security system (100). Additional infrared sensors can be placed in the vehicle, such as inside of a trunk or cargo area of the vehicle, if desired.

Supporting the primary printed circuit board assembly (1) and secondary printed circuit board assembly (9) is a faceplate (11). Overlaying the faceplate (11) is a graphic overlay (12) which is visible inside the vehicle. The graphic overlay (12) and faceplate (11) are secured to the console of the vehicle by a plurality of faceplate screws (13).

The security system (100) has three timeouts. These timeouts are time periods, each of which can be preselected by a user via the DIP switch. These timeouts include the (1) time-to-arm, (2) time-to-trigger and (3) time-to-sound the siren. These user selectable timeouts are coded into the system software and are selected using a combination of switch settings controlled by the light/siren controller of the vehicle.

The time-to-arm is the length of time that is required for the system to arm itself after the vehicle is turned off. This length of time is selectable by the user. The time-to-arm is set using the DIP switch (14). Preferably, the selectable times are 30 seconds, 60 seconds, 90 seconds and 120 seconds. Although these are the preferred selectable times-to-arm, other times could be established, if desired. The time-to-arm gives the user a time period in which to exit the vehicle before the vehicle security system (100) is armed.

The time-to-trigger is the length of time that is required to trigger the light/siren controller to activate the lights and siren of the vehicle after the IR sensor (10) has detected movement in the vehicle. The length of the time for the time-to-trigger is also user selectable. Preferably, the selected length of time for the time-to-trigger is chosen from a variety of possible time periods which include: 10 seconds, 20 seconds, 30 seconds and 40 seconds. Although these are the preferred selectable times-to-trigger, other times could be established, if desired. The time-to-trigger gives the user time to enter and start a vehicle before the siren and lights are triggered by the armed security system (100). By starting the vehicle, the security system (100) is immediately disarmed and as a result, the siren and lights are not actuated.

The time-to-sound the siren is the preselected length of time that the siren sounds after being activated. The siren will sound for the length of the time period that has been preselected for the time-to-sound. Meanwhile the lights will continue to flash until the security system (100) is reset by starting the vehicle.

The vehicle security system (100) re-arms itself automatically after the time period of the time-to-sound has elapsed, and the siren has stopped. The re-armed-security system (100) will still function to activate the siren if subsequent movement is detected within the vehicle.

The security system (100) automatically begins a countdown of the time period of the time-to-arm directly after the vehicle's engine is turned off. The time-to-arm the security system (100) is the preselected time period between the moment the ignition is turned off and the security system (100) is actually armed.

Therefore, to arm the system (100), the user turns off the ignition of the vehicle, which begins the countdown of the time period for the time-to-arm. After the time period for the tune-to-arm has elapsed, the security system (100) arms itself, provided that the infrared sensor (10) has not detected any movement within the vehicle for the entire countdown period. If movement is detected during that time period of the countdown, the countdown stops and the time period resets and the countdown begins anew. This is a programmed feature that allows an officer or other authorized individual to remain in the vehicle after turning off the ignition without concern that any alarm will be activated.

At such time that the entire countdown of the time period for the time-to-arm elapses without any movement being detected by the infrared sensor(s) the security system (100) arms itself. The armed indicator (6), which comprises a light disposed on the faceplate (11), becomes illuminated and denotes that the security system (100) is armed. After the security system (100) is armed, the infrared sensor (10) continues to monitor the vehicle's interior area for evidence of movement to determine if anyone enters the vehicle.

In the event person is detected by the infrared sensor (10) when the security system (100) is armed, a countdown of the time period for the time-to-trigger begins. The time-to-trigger is a preselected period of time that elapses between the armed security system (100) being set off by a person entering the vehicle and the alarms being activated by the security system.

By starting the vehicle within the countdown of the time period for the time-to-trigger, the security system (100) is disarmed. In the event that the security system (100) is triggered and the alarms accidentally activated, the ignition of the vehicle can be engaged to start the vehicle and the security system (100) will be reset, thereby stopping the alarms.

Furthermore, the vehicle security system (100) can be disabled. When disabled, the security system (100) is inactive and will not arm itself automatically when the ignition of the vehicle is turned off. Disabling the security system is sometimes desirable, such as, when the vehicle is being serviced, repaired or stored.

In order to disable the security system (100), the enable/disable button (4) on the security system is depressed for a predetermined length of time, preferably three seconds, After the predetermined length of time has elapsed with the enable/disable button (4) depressed, the security system (100) is disabled and the light of the enable/disable indicator (5) will illuminate on the graphic overlay (12). The light of the enable/disable indicator (5) is visible inside of the vehicle and indicates that the security system (100) has been disabled. The security system (100) will remain disabled until further action is taken. With the security system (100) disabled, the ignition of the vehicle can be turned off without the security system (100) being armed and consequently, persons can move throughout the vehicle without triggering the alarms of the security system (100).

To enable the vehicle security system (100) after the system has been disabled, the enable/disable button (4) is depressed for a predetermined period of time, preferably three seconds. After the predetermined time period has elapsed with the enable/disable button depressed (4), the security system (100) is enabled and the light of the enable/disable indicator (5) turns off, indicating that the security system (100) is ready for use.

The security system (100) of the present invention uses the ignition of the original vehicle manufacturer's equipment. There is no need for retrofitting an ignition for the security system (100).

The security system (100) arms automatically when the vehicle is turned off. Therefore, there are no additional steps to be taken by the user in order to arm the sect system. Similarly, there are no additional steps required by a user to disarm the security system. The system disarms itself automatically when the vehicle's ignition is turned on.

It is noted that the security system (100) of the current invention may comprise audible indicators to alert a user of certain operating conditions that may be experienced while the system is in use. Such operating conditions may include activation, disablement and/or enablement of the security system (100). The security system (100) may also comprise an input that could use a factory installed keyless entry device or an aftermarket keyless entry device to a or disarm the system.

Although the present invention has been described in considerable detail with reference to certain preferred versions thereof, other versions are possible. Therefore, spirit and scope of the appended claims should not be limited to the description of the preferred versions contained herein.

The invention claimed is:

1. A security system for a vehicle comprising:
a primary printed circuit board assembly;
a secondary printed circuit board assembly connected to the primary printed circuit board assembly;
a microprocessor disposed on the primary printed circuit board assembly;
at least one infrared sensor supported on the secondary printed circuit board assembly that monitors the vehicle by detecting movement therein;
a plurality of timeouts coded into the microprocessor;

said primary printed circuit board assembly comprises an input/output terminal block that provides power input to the security system and function output to the vehicle;

wherein the function output of the input/output terminal block includes a first alarm output that triggers a light/siren controller of the vehicle, a second alarm output that activates the siren of the vehicle, and a third alarm output that activates the lights of the vehicle.

2. The security system of claim 1, further comprising an enable/disable button for disabling the security system, and for enabling the security system when the system has been disabled.

3. The security system of claim 1, wherein said plurality of timeouts comprises a time-to-arm, a time-to-trigger and a time-to-sound.

4. The security system of claim 3, wherein said primary printed circuit board assembly further comprises a dual in-line switch, wherein each of the time periods of the time-to-arm, the time-to-trigger, and the time-to-sound are preselected by a user via the dual in-line switch.

5. A security system for a vehicle comprising:
a primary printed circuit board assembly;
a microprocessor disposed on the primary printed circuit board assembly;
at least one infrared sensor that monitors the vehicle by detecting movement therein;
at least one timeout that is coded into the microprocessor;
said primary printed circuit board assembly comprises an input/output terminal block that provides power input to the security system and function output to the vehicle;
said at least one timeout comprises a time-to-arm;
wherein the function output of the input/output terminal block includes a first alarm output that triggers a light/siren controller of the vehicle, a second alarm output that activates the siren of the vehicle, and a third alarm output that activates the lights of the vehicle; and
wherein said time-to-arm is a time period that counts down from when the ignition of the vehicle is turned off to when the security system arms.

6. The security system of claim 5, wherein when the vehicle is turned off, a countdown for the time period of the time-to-arm automatically begins.

7. The security system of claim 6, wherein when the countdown for the time period for the time-to-arm has elapsed during which no movement has been detected in the vehicle, the security system arms.

8. The security system of claim 7, further comprising an armed indicator, wherein when the security system is armed, the armed indicator illuminates.

9. The security system of claim 7, wherein said at least one timeout further comprises a time-to-trigger, said time to trigger comprising a time period extending from when movement is detected in the vehicle when the first alarm output triggers the light/siren controller of the vehicle.

10. The security system of claim 9, wherein when said first alarm output triggers the light/siren controller of the vehicle, the second alarm output activates the siren, and the third alarm output activates the lights of the vehicle when the countdown of the time period for the time-to-trigger expires.

11. The security system of claim 10 wherein said at least one timeout further comprises a time-to-sound, wherein the time-to-sound is a time period that the siren sounds after being activated, and wherein when the time period of the time-to-sound has elapsed, the siren stops sounding.

12. The security system of claim 11, wherein when the time-to-sound has expired, the security system arms the time-to-sound anew while the lights continue to flash.

13. The security system of claim 6, wherein when movement is detected in the vehicle during the countdown of the time period for the time-to-arm, the time period of the time-to-arm resets and another countdown begins anew; wherein when the time period of the time-to-arm elapses and no movement has been detected in the vehicle, the security system arms.

14. The security system of claim 13, wherein when the at least one infrared sensor detects movement in the armed vehicle, the function output of the input/output terminal block triggers the first alarm output which activates the light/siren controller of the vehicle.

15. The security system of claim 14, wherein when the first alarm output is triggered, the second alarm output is activated.

16. The security system of claim 15, wherein the second alarm output activates a siren in the vehicle, thereby sounding the siren.

17. The security system of claim 16, wherein when the first alarm output is triggered, the third alarm output is activated.

18. The security system of claim 17, wherein the third alarm output activates the lights of the vehicle and the lights begin flashing.

19. The security system of claim 18, wherein said at least one timeout further comprises a time-to-trigger, said time to trigger comprising a time period extending from when movement is detected in the armed vehicle to when the light/siren controller is triggered.

20. The security system of claim 5, wherein the at least one timeout further comprises a time-to-sound;
said time-to-sound being a time period that the siren will sound after being activated, and wherein when the time period of the time-to-sound has elapsed, the siren stops sounding.

21. The security system of claim 20, wherein the at least one timeout further comprises a time-to-trigger;
said time-to-trigger being a time period extending from when movement is detected in the vehicle to when the first alarm output triggers the light/siren controller of the vehicle.

22. A vehicle security system for a vehicle having an interior area with a console, an electrical system with an ignition, an engine, a light/siren controller, lights and a siren, the vehicle security system comprising:
a primary printed circuit board assembly;
a secondary printed circuit board assembly;
a microprocessor, wherein said microprocessor is disposed on the primary printed circuit board assembly;
a cable assembly, wherein said cable assembly interconnects the primary printed circuit board assembly and the secondary printed circuit board assembly;
at least one infrared sensor, wherein said at least one infrared sensor is disposed on the secondary printed circuit board assembly and monitors the interior area of the vehicle;
a faceplate supporting the primary printed circuit board assembly;
a graphic overlay adjacent to said faceplate, wherein the faceplate and said graphic overlay are adapted to be mounted on the console of the vehicle;
a plurality of timeouts, wherein said timeouts are coded into the microprocessor;
said plurality of timeouts comprises:

a time-to-arm;
a time-to-trigger; and
a time-to-sound;
said primary printed circuit board assembly comprises:
an input/output terminal block;
a dual in-line switch;
an infrared expansion port disposed on the primary printed circuit board assembly for receiving the at least one infrared sensor;
an armed indicator comprises lights disposed on the primary printed circuit board assembly, wherein said armed indicator is visible inside the vehicle;
an enable/disable button disposed on the primary printed circuit board assembly, wherein the enable/disable button can be depressed to disable or enable the vehicle security system; and
an enable/disable indicator comprising a light disposed on the primary printed circuit board assembly and visible inside the vehicle, wherein when said enable/disable indicator is illuminated, the security system is enabled and ready for use, and when the enable/disable indicator is not illuminated, the security system is disabled and not useable;
said input/output terminal block provides power input to the security system and function output to the vehicle;
wherein, the function output of the input/output terminal block includes a first alarm output, a second alarm output, and a third alarm output;
wherein when activated, said first alarm output triggers the light/siren controller of the vehicle to enable the siren and lights of the vehicle to be actuated;
wherein said second alarm output actuates the vehicle's siren;
wherein the third alarm output actuates the vehicle's lights;
wherein when the infrared sensor senses movement in the interior area of the vehicle, the first alarm output is triggered;
wherein the time-to-arm is a preselected time period that extends from when the ignition is turned off to when the security system arms;
wherein when the ignition is turned off, the security system begins a countdown for the time period of the time-to-arm and when the time period of the time-to-arm has elapsed, the security system arms;
wherein the time-to-trigger is a preselected time period extending from when the at least one infrared sensor detects movement in the vehicle to when the light/siren controller is triggered and the second and third alarm outputs activate the siren and the lights, respectively;
wherein the time-to-sound is the time period that the siren sounds after being activated;
wherein after the siren is activated and the time period for the time-to-sound has elapsed, the siren stops sounding and the security system rearms the second alarm output, while the lights continue to flash;
wherein the time periods for each of the time-to-arm, the time-to-trigger, and the time-to-sound are user selectable via the dual in-line switch;
wherein the vehicle security system is installed on the console of a vehicle and wired into the vehicle's electrical system;
wherein, when the ignition is turned off, a countdown for the time period of the time-to-arm automatically begins and, when the time period of the time-to-arm has elapsed, the security system arms and the armed indicator is illuminated;
wherein, when movement is detected in the vehicle by the infrared sensor during the countdown for the time period of the time-to-arm, the countdown stops and a subsequent countdown for the time period of the time-to-arm begins anew, when movement is not detected in the vehicle during a countdown of the time period for the time-to-arm, the security system arms;
wherein, when the security system is armed and movement is detected within the vehicle, a countdown for the time period of the time-to-trigger begins; when the time period of the time-to-trigger has elapsed, the first output triggers the light/siren controller, the second alarm output activates the siren, and the third alarm output activates the lights;
wherein, when the second alarm output activates the siren, a countdown of the time period for the time-to-sound begins and after the time period has elapsed, the siren stops and the security system resets the time-to-sound while the lights continue to flash;
wherein to disable the security system, the enable/disable button is depressed for a predetermined length of time;
wherein when the security system is disabled the enable/disable indicator light is illuminated; and
wherein to enable the security system after the system has been disabled, the enable/disable button is depressed for a predetermined length of time;
wherein when the security system is enabled the enable/disable indicator light is off.

* * * * *